May 2, 1933. A. C. LINDGREN ET AL 1,906,692
CORN PICKER
Filed March 14, 1930 2 Sheets-Sheet 1
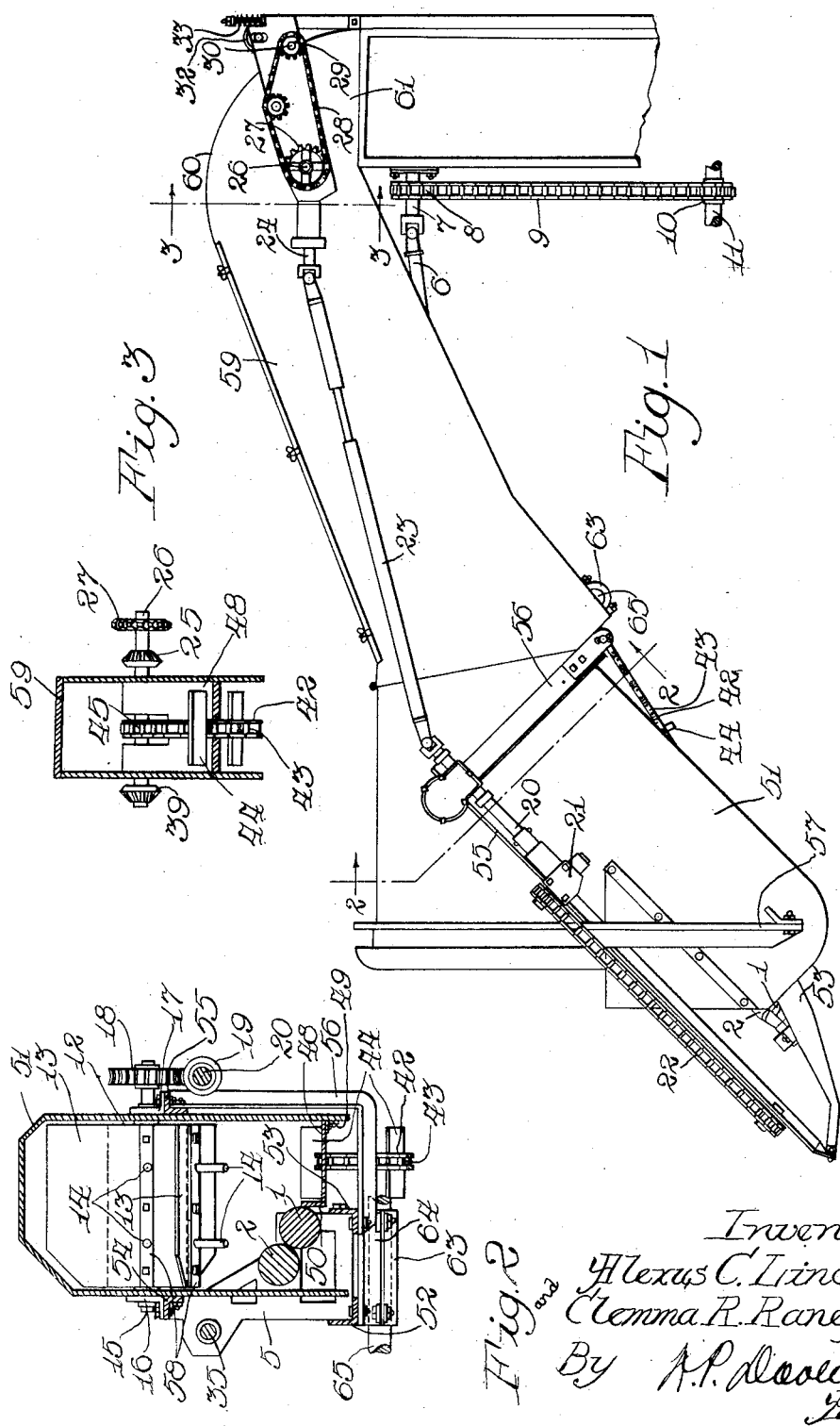
Inventors.
Alexus C. Lindgren
Clemma R. Raney
By A. P. Doolittle,
Atty.

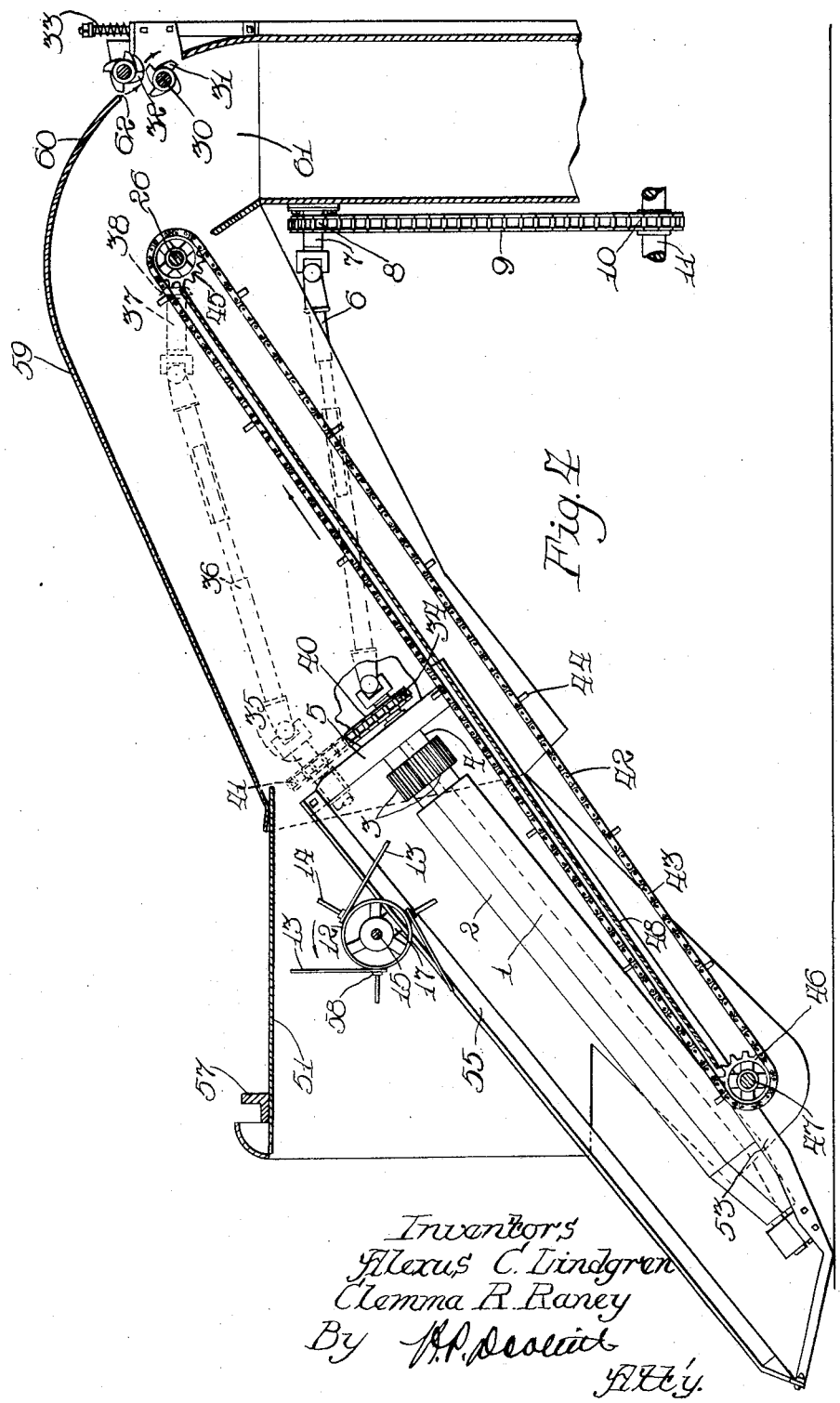

Patented May 2, 1933

1,906,692

UNITED STATES PATENT OFFICE

ALEXUS C. LINDGREN, OF CHICAGO, AND CLEMMA R. RANEY, OF RIVERSIDE, ILLINOIS, ASSIGNORS TO INTERNATIONAL HARVESTER COMPANY, A CORPORATION OF NEW JERSEY

CORN PICKER

Application filed March 14, 1930. Serial No. 435,728.

This invention relates to corn pickers. More particularly it relates to improvements in ear removing and conveying means.

A principal object of the invention is to improve the functioning of a corn picker by providing means adapted to cooperate with the snapping means and the ear conveying and delivering means to assure their continuous and effective operation.

A more specific object is to provide and position a novel beating and forwarding means in such a position relative to the snapping rolls and the ear conveyor of the picker that broken stalks, weeds and other trash will not accumulate and check the effective operation of the mechanism.

Another object is to construct a novel, self-cleaning beater element.

Other objects will be apparent from the detailed description to follow.

The objects of the invention are accomplished by mounting a rotating beater transversely over the snapping rolls near the upper end thereof. The beater element also extends transversely over the ear conveyor and is positioned in the throat of the conveyor shaft. Resilient members mounted on the beater are adapted to press downwardly toward the snapping rolls and the conveyor. A series of radially extending spikes rigidly attached to the beater constitute positive means for moving material in the vicinity of the beater. Stalks, weeds and other trash, which have not been engaged by the snapping rolls by the time such material has reached the upper end of the snapping rolls, are engaged by the beater member and pressed against the snapping rolls, which tend to engage the material and force it between the rolls out of the picker mechanism.

As the ear conveyor extends downwardly along the side of the snapping rolls, some broken stalks and trash fall with the ears over into the conveyor. The conveyor flights engage this material and carry it upwardly into the enclosure surrounding the upper portion of the conveyor. The beater element positioned in the throat leading to the enclosure engages any material carried on the conveyor and presses it down firmly against the conveyor flights. The spikes on the beater also positively engage and move the material being carried upwardly over the conveyor.

The self-cleaning of the beater is accomplished by arranging the spikes and resilient flaps as will be hereinafter described in detail, so that the free end of each flap lies against adjacent members of a series of spikes when in pressed down position. When pressure on the flaps is released, they spring back to their rigid position tending thereby to strip the spikes of any material which has accumulated thereon.

Trash rollers are also provided at the top of the enclosure over the conveyor beyond the termination of the conveyor. The combination of the beater elements at the entrance to the enclosure and trash rolls at the exit permits the use of a housing or enclosure having a comparatively small cross section. The stalks and trash pressed firmly against the conveyor flights are delivered in the direction of the trash rollers. The rollers are positioned a sufficient distance from the end of the conveyor to allow the ears to drop freely and close enough to engage and remove the major portion of the trash.

In the drawings:

Figure 1 is a side elevation showing a corn picker unit embodying the elements of the invention and associated cooperating elements;

Figure 2 is a cross section on the line 2—2 of Figure 1;

Figure 3 is a cross section on the line 3—3 of Figure 1; and,

Figure 4 is a longitudinal section showing the interior of the picker unit.

In the drawings, only such parts of the corn picker unit are shown as are necessary to illustrate the structure and functioning of the mechanism constituting the invention. A complete corn picker in which the unit illustrated and described herein is a part is shown in the copending United States Patent application Serial No. 476,256 filed August 19, 1930.

The snapping mechanism of the unit illustrated is of a well known conventional construction. The frame structure on which said mechanism is mounted is constructed of angle bars properly braced to secure the necessary rigidity. The snapping rolls 1 and 2 are mounted for rotation on the frame structure in the usual manner. The rolls are connected together by gears 3 for rotation toward each other. The shaft 4 on which the lower roll 1 is mounted extends beyond the bearing bracket 5 and is joined by a universal joint to a shaft 6. The shaft 6 is connected by a second universal joint to a shaft 7 which carries a chain sprocket 8. A chain 9 connects the sprocket 8 with a sprocket 10 on a driving shaft 11.

The beater member consists of a cylindrical drum-like element 12, resilient flaps 13 and rigid spikes 14, all of which are secured to the drum-like element. A shaft 15 supported for rotation on the brackets 16 and 17, which are mounted on the frame structure, carries the beater member. A gear 18 mounted on the shaft 15 is operatively engaged by a worm 19 mounted on a shaft 20. The shaft 20 extends at one end to a gear casing 21 whereby power is transmitted to a chain 22 which constitutes a part of the stalk gathering means, not shown in detail. The other end of the shaft 20 is connected by a universal joint to a shaft 23.

The shaft 23 is connected by a second universal joint to a short shaft 24 which carries means for driving the gear 25 mounted on the transverse shaft 26, as best shown in Figure 3. The shaft 26 carries a chain sprocket 27 which is connected by a chain 28 to a sprocket 29 mounted on a second transverse shaft 30. The shaft 30 carries a trash roller 31. A second trash roller 32 is mounted above the trash roller 31 and is resiliently pressed toward said member by a spring 33.

A chain sprocket 34 is mounted on the snapping roll shaft 4. A short shaft 35 rotatably mounted on the frame structure of the picker is connected by universal joints and a shaft 36 to a shaft 37. A gear 38 on the shaft 37 operatively engages the gear 39 on the shaft 26, as best shown in Figure 3. A driving chain 40 operatively connects the sprocket 34 with a gear 41 mounted on the shaft 35.

The shaft 26 also serves as a support and drive for the endless conveyor 42. The conveyor 42 is made up of a link chain 43 and conveyor flights 44 secured to the chain at spaced intervals. The chain 43 operatively engages and is driven by a sprocket 45 mounted on the shaft 26. The lower end of the conveyor is supported by a sprocket 46 mounted on a shaft 47 mounted below the lower end of the snapping rolls.

The conveyor 42 extends alongside the snapping rolls on a level slightly below the lower roll 1, as shown in Figure 2. A platform or guide 48 is mounted on an angle bar 49 and by other means not shown in detail. The platform 48 has a vertical extension 50 which terminates adjacent the edge of the snapping roll 1. The flights 44 of the conveyor extend from said extension to the adjacent side wall of a housing or hood 51 surrounding and forming an enclosure for the conveyor, the snapping rolls and the beater member.

The bracket structure 5 which supports the upper ends of the snapping rolls is secured to angle bars 52, 53 and 54. These bars constitute a portion of the frame structure previously referred to. The housing 51 is secured to and supported by these angle bars and also by other longitudinally extending angle bars, such as illustrated by the angle bar 55. An L-shaped angle bar 56 is secured to the bar 53 and the bar 55 and constitutes a portion of the bracing means previously referred to. A U-shaped angle bar 57 extends over the top of the enclosure 51 and, in addition to its bracing function, forms a support for said enclosure.

A bearing bracket 63 is secured to the angle bars 52 and 53. A bearing cap 64 cooperates with the bearing bracket to pivotally mount the main frame structure on a supporting shaft 65. The shaft 65 is rigidly secured to a tractor frame or any other suitable support in any approved manner.

The beater member extends to the opposite side walls of the hood or enclosure 51. The resilient flaps 13 are co-extensive lengthwise of the cylindrical portion of the beater member and extend outwardly therefrom. The flaps are secured to the drum-like body portion at a tangent thereto by small bars 58. Each of the bars 58 also carries rigidly secured thereto a pair of the spikes 14, one of said spikes being substantially over the center of the conveyor,—the other being over the meeting point of the snapping rolls. The length of the flaps is such that the path followed by the outside free edges of the flaps reaches on rotation of the beater member substantially to the top of the hood or enclosure and downwardly to a point adjacent the upper edge of the lower snapping roll. One corner of each of the flaps is cut off at an angle, so it will clear the angular corner of the housing and the upper snapping roll.

The enclosure 59 around the upper portion of the conveyor is constricted in cross section as is shown in Figure 3. It will be noted that the side walls of the enclosure 59 are closely adjacent the ends of the conveyor flights and that the space above the conveyor tapers towards the upper end, as best shown in Figure 4. The upper end of the enclosure 59 has a downwardly curved portion 60, which joins with a chute 61, only a portion of which is shown. The chute 61 may lead to an elevator or to a husking mechanism. An opening 62 is provided in the curved portion 60 of the enclosure. The trash rollers 31 and 32 previously described are mounted in the opening 62.

In the operation of this device, power from the shaft 11, which may be connected to a tractor power takeoff, is transmitted through the chain 9, shafts 7 and 6, to the shaft 4, which carries one of the snapping rolls. Through the sprocket 34 mounted on the shaft 4, the chain 40, the sprocket 41 and shafts 35, 36 and 37, and gear 39, power is transmitted to the shaft 26. The shaft 26 drives the conveyor through the sprocket 45 and the trash rollers by means of the sprocket 27 and the chain 28.

The shaft 26 also transmits power through the gear 25, the shafts 24, 23 and 20, to the gear casing 21, by means of which the gathering chain 22 is driven. The shaft 20 carries the worm 19 which drives the shaft 15 on which the beater element is mounted.

The corn stalks gathered by the gathering chain 22 and other mechanism not shown are directed between the snapping rolls 1 and 2. Corn snapped from the stalks by said rolls drops over onto the conveyor 42 running alongside the rolls and is carried up the platform 48 and delivered into the chute 61.

The stalks are normally rolled between the snapping rolls. It often happens, however, that the stalk breaks and a portion of it, which may be still carrying an ear, is carried upwardly. There is also some times other trash, such as weeds, picked up by the stalk gathering means, and carried into the throat of the picking mechanism. Heretofore considerable difficulty has been experienced with the clogging up of the mechanism, due to the accumulation of trash above the rolls and over the conveyor. Also considerable of the trash may be carried upwardly into the enclosure above the conveyor. In this device, material above the snapping rolls is pushed downwardly thereagainst by the resilient flaps 13 on the beater member. A major portion of the stalks and trash is caught by the snapping rolls and rolled through out of the mechanism. The spikes 14 on the beater member will engage the material which is not moved by the resilient flaps. Material which has fallen over onto the conveyor is also engaged by the beater member and pressed firmly against the conveyor whereby it may be carried through the conveyor enclosure without choking said enclosure. The stalks and trash at the upper end of the conveyor are delivered over the end directly toward the trash rollers where said material is engaged by said rollers and removed from the enclosure.

It is to be understood that only one specific embodiment of the invention has been illustrated and described in detail, but applicants limit their invention only by the scope of the appended claims.

What is claimed as new is:

1. In a corn picker, the combination of ear snapping means, conveying means positioned alongside the snapping means, and means comprising a single element extending over the snapping means and the conveying means acting to press material against said elements and assist in the functioning thereof.

2. In a corn picker, the combination of snapping rolls, an ear conveyor positioned alongside said rolls, means for assisting the functioning of the snapping rolls comprising a rotatable member mounted above said rolls and extending over the snapping rolls and the ear conveyor, and means for rotating said member.

3. In a corn picker, the combination of snapping rolls, an ear conveyor positioned alongside said rolls to receive ears therefrom, means for assisting the functioning of the snapping rolls comprising a rotatable member mounted above said rolls, said rotatable member being provided with a series of flexible flaps extending therefrom, and means for rotating said member.

4. In a corn picker, the combination of snapping rolls, an ear conveyor positioned alongside said rolls to receive ears therefrom, means for assisting the functioning of the snapping rolls comprising a rotatable member transversely mounted above said rolls, said rotatable member being provided with a series of spikes extending therefrom, and means for rotating said member.

5. In a corn picker, the combination of snapping rolls, a near conveyor positioned alongside said rolls and extending upwardly therefrom, enclosing means around the upper portion of the ear conveyor extending downwardly to the snapping rolls, and means positioned at the entrance to said enclosing means adapted to assist in the functioning of the conveyor by pressing resiliently downwardly thereagainst.

6. In a corn picker, the combination of snapping rolls, an ear conveyor positioned alongside said rolls and extending upwardly therefrom, enclosing means around the upper portion of the ear conveyor extending downwardly to the snapping rolls, and means consisting of a rotatable member mounted on an axis transversely of the conveyor positioned at the entrance to said enclosing means adapted to assist in the functioning of the conveyor by pressing resiliently downwardly thereagainst.

7. In a corn picker, the combination of snapping rolls, an ear conveyor positioned alongside said rolls and extending upwardly therefrom, enclosing means around the upper portion of the ear conveyor extending downwardly to the snapping rolls, and means positioned at the entrance to said enclosing means adapted to assist in the functioning of the snapping rolls and the conveyor by pressing resiliently downwardly thereagainst.

8. In a corn picker, the combination of snapping rolls, an ear conveyor positioned alongside said rolls and extending upwardly therefrom, enclosing means around the upper portion of the ear conveyor extending downwardly to the snapping rolls, and means consisting of a rotatable member mounted on an axis transversely of the conveyor and the snapping rolls and extending over said elements positioned at the entrance to said enclosing means and adapted to assist in the functioning of the conveyor and the snapping rolls by pressing resiliently downwardly thereagainst.

9. In a corn picker, the combination of snapping rolls, an ear conveyor positioned alongside said rolls and extending upwardly therefrom enclosing means around the upper portion of the ear conveyor extending downwardly to the snapping rolls, trash rolls positioned beyond the upper end of the conveyor, and means positioned at the entrance to said enclosing means adapted to assist in the functioning of the conveyor by pressing resiliently downwardly thereagainst.

10. In a corn picker, the combination of snapping rolls, an ear conveyor positioned alongside said rolls and extending upwardly therefrom, enclosing means around the upper portion of the ear conveyor extending downwardly to the snapping rolls, trash rollers positioned at the upper end of the enclosing means for the conveyor and spaced from said conveyor to provide for discharging ears from the conveyor, and means positioned at the entrance to said enclosing means adapted to assist in the functioning of the conveyor by pressing resiliently downwardly thereagainst.

11. In a corn picker, the combination of snapping rolls, an ear conveyor positioned adjacent the rolls, a beater element comprising a body member having flexible flaps and rigid spikes extending therefrom, means for mounting said member for rotation on an axis transversely of the rolls and the conveyor and spaced therefrom, and means adapted to rotate the beater element during operation of the cornpicker.

12. In a corn picker, the combination of upwardly extending snapping rolls, an ear conveyor positioned adjacent the rolls, a beater element comprising a body member, flexible flaps extending substantially tangentially from said member, means for mounting said member for rotation on an axis transversely to the conveyor and spaced thereabove, and means adapted to rotate the beater element during operation of the picker.

13. In a corn picker, the combination of upwardly extending snapping rolls, an ear conveyor positioned adjacent the rolls, a beater element comprising a body member, means for mounting said member for rotation on an axis transversely of the conveyor, means adapted to rotate said member during operation of the picker mechanism, and rigid spikes extending from said body member.

14. In a corn picker, the combination of upwardly extending snapping rolls, an ear conveyor positioned adjacent the rolls, a beater element comprising a body member, means for mounting said element for rotation on an axis transversely of the conveyor, means adapted to rotate said member during operation of the picker mechanism, and two series of spikes extending from said body member, one series being positioned to pass over and adjacent the snapping rolls, and the other series being positioned to operate in the path of material being carried by the conveyor.

15. In a corn picker, the combination of upwardly extending snapping rolls, an ear conveyor positioned adjacent the rolls, a beater element comprising a body member, flexible flaps attached to said member and extending substantially tangentially therefrom, spikes attached to the body member and extending substantially rigidly therefrom, means for mounting said member for rotation on an axis at right angles to the conveyor and spaced thereabove, and means adapted to rotate the beater element during operation of the corn picker.

In testimony whereof we affix our signatures.

ALEXUS C. LINDGREN.
CLEMMA R. RANEY.